Patented Oct. 18, 1938

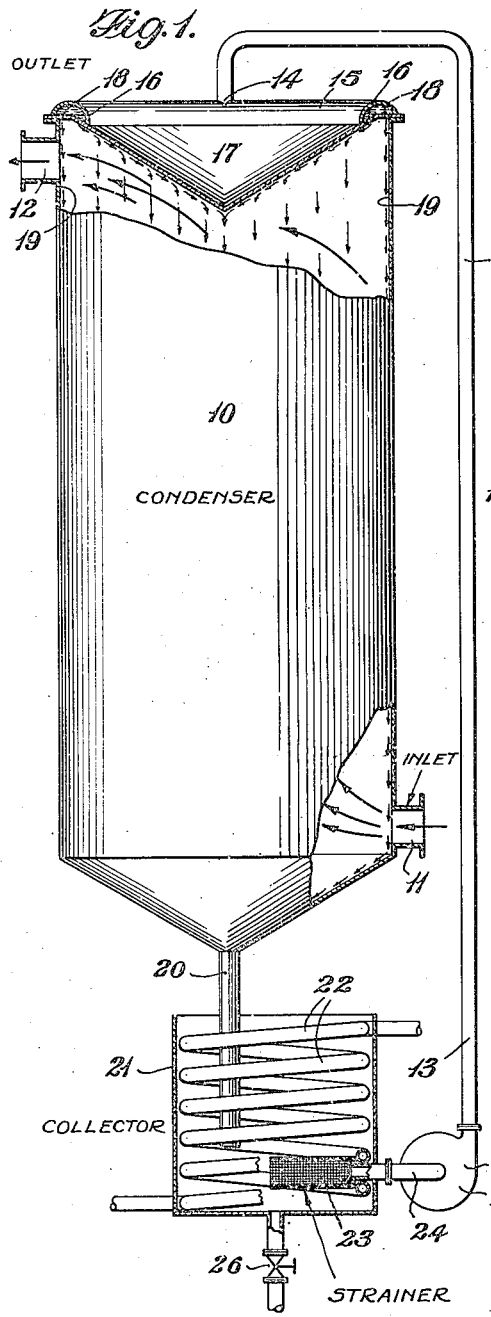
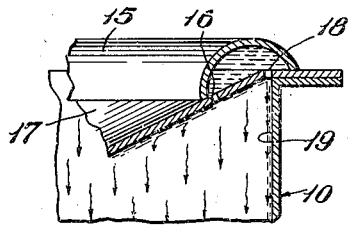
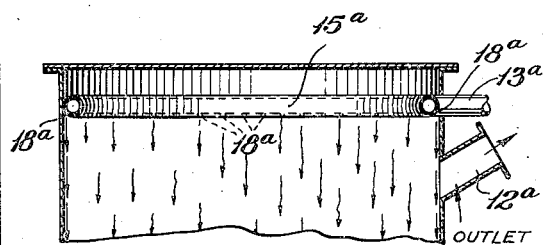
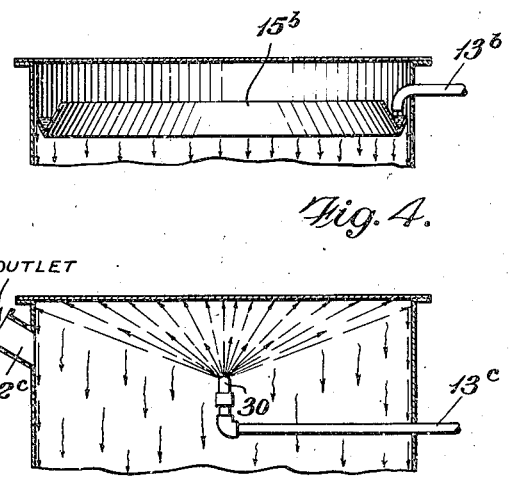

2,133,904

UNITED STATES PATENT OFFICE 2,133,904

PROCESS FOR SCRUBBING VAPORS CONTAINING PHTHALIC ANHYDRIDE

Helmuth Reichhold, Bloomfield Hills, and Carl H. B. Jarl, Royal Oak, Mich., assignors to Beck, Koller & Company, Inc., Detroit, Mich.

Application April 23, 1937, Serial No. 138,656

10 Claims. (Cl. 260—343)

The invention relates to the removal of phthalic anhydride from vapors containing it by scrubbing with a liquid, preferably of a type which may be subsequently reacted with the recovered phthalic anhydride to form a useful product such as an alkyd resin, thus avoiding the necessity for separating the phthalic anhydride from the scrubbing liquid.

Phthalic anhydride as now manufactured by catalytic air oxidation leaves the converter in vapor form and mixed with air in a proportion of approximately 1 to 20. The phthalic anhydride is generally recovered from the mixture by gradually cooling the vapor down to room temperature in a series of condensers. In this manner a fractional condensation is accomplished so that the purer material condenses in the hotter zone of the condenser train. According to present practice the condensed phthalic anhydride may then be removed from the condensers in various ways such as by the use of mechanical scrapers or by periodic heating of the condenser walls, thus melting the material on the walls and collecting it in suitable containers. In each of these processes the phthalic anhydride and part of the impurities present in the vapors are recovered together.

In the manufacture of alkyd resins for surface coatings or other purposes, solid phthalic anhydride is mixed with a polyhydric alcohol such as glycerine and various drying, semi-drying or non-drying oils and cooked into resins. Such processes involve a large amount of handling of materials thereby increasing the cost of manufacture.

The purpose of the present invention is to avoid the cumbersome methods heretofore practiced of recovering phthalic anhydride from the condensers and also to avoid handling of the very bulky material produced thereby in solid form. To accomplish this, glycerine or other polyhydric alcohol and/or oils or fatty acids are circulated through a condenser in such a manner as to keep the walls of the condenser wet. A number of improved results are obtained by employing this procedure. The condensers do not require the frequent cleaning heretofore necessary and the oils, glycerine or other substances used as the scrubbing agent prevent the phthalic anhydride and impurities from condensing directly on the walls of the condenser, thus maintaining a surface of substantially constant heat conductivity. The product obtained from the condenser consists of a slurry which is a mixture of phthalic anhydride and the scrubbing liquid. This product may be handled with pumps and may be directly used for the manufacture of synthetic products of the alkyd type.

The scrubbing liquid may include polyhydric alcohols such as glycerine or ethylene glycol and oils of the drying, semi-drying or non-drying type, glycerides of oils formed by alcoholysis, and fatty acids of drying, semi-drying or non-drying oils.

The particular scrubbing agent employed in any particular instance depends on the composition of the alkyd resin which is to be manufactured from the mixture of phthalic anhydride and the scrubbing liquid. Among the oils which may be employed are the drying oils such as linseed, parilla, converted castor, fish and wood oils; semi-drying oils such as soya bean and sun flower oils, or non-drying oils such as castor, coconut, cottonseed and wood oils. Likewise the fatty acids may be of any suitable type such as may be derived from oils of the classes above enumerated. Preferably mixtures of glycerine and oils and/or fatty acids are employed as the scrubbing agent. While numerous types of oils have been mentioned above I prefer to use oils of the semi-drying type.

The scrubbing process may be carried out for a sufficient length of time to condense all of the phthalic anhydride from a vapor of known concentration.

The composition of the recovered mixture may be varied if desired by the addition of any substance or substances required for the preparation of an alkyd resin having the desired characteristics. Any suitable and well known process for producing the alkyd resin may be employed as set forth for example in the following patents: 1,098,777, Arsem, June 2, 1914; 1,893,873, Kienle, Jan. 10, 1933; 1,893,874; Adrams, Jan. 10, 1933; and 2,041,248, Hovey, May 19, 1936.

It will be understood that the reaction may take place in any number of stages, additional quantities of the reacting ingredients being added as required at any suitable stage of the procedure, as is well understood in the art.

The process may be successfully carried out in an apparatus such as is shown for the purpose of illustration in the accompanying drawing in which:

Fig. 1 is a side elevation partly broken away to show the interior of a vertical cylindrical condenser provided with means for keeping the top of the condenser head wet.

Fig. 2 is a detailed view showing a portion of the top of a condenser and the manifold employed for supplying the scrubbing liquid thereto.

Fig. 3 is a fragmentary detailed view showing a portion of the top of a modified form of condenser.

Fig. 4 is a similar view showing a further modification.

Fig. 5 is a fragmentary view of still another modification wherein a spray nozzle is employed for supplying the scrubbing liquid.

Referring particularly to Figs. 1 and 2 the reference numeral 10 denotes a vertical cylindrical condenser provided with means for keeping the top head wet. The vapor inlet 11 is shown adjacent the bottom of the condenser through which a rich mixture containing phthalic anhydride and air is admitted from the converter. The vapors pass upwardly in countercurrent to the scrubbing and cooling liquid and the scrubbed gases are taken off at 12 adjacent the top of the condenser. The scrubbing liquid is supplied through a pipe 13 and may consist of glycerine or other polyhydric alcohol, oil, glycerides, fatty acids or mixtures thereof. The scrubbing liquid is admitted at the top through an opening 14 into a manifold 15 provided with a plurality of openings 16 which are adapted to admit the liquid to the underside of a cone-shaped head 17. Another series of openings 18 admits the scrubbing liquid to the side wall 19 of the condenser. A portion of the scrubbing liquid trickles down the sides of the condenser and another portion trickles down the inclined top portions falling off at various intervals and passing in countercurrent to the rising vapors. The liquid trickling down the sides and top of the condenser prevents the formation of a hard coating of phthalic anhydride on the surfaces of the condenser. The drops of liquid which come in contact with the rising vapors scrub and condense the phthalic anhydride from such vapors and the mixture of phthalic anhydride and scrubbing agent is carried down to the bottom of the condenser which is herein shown as conical in form and provided with a central outlet pipe 20 which leads to a collector 21. This collector may be provided with suitable heat exchange coils 22 through which a heating or a cooling fluid may be supplied as required for maintaining the collected mixture in the form of a liquid and at the proper temperature. A strainer 23 is provided adjacent the bottom of the collector which covers the opening to a recirculation pipe 24 through which the scrubbing liquid is withdrawn and passed by means of a pump 25 through the pipe 13 leading again to the top of the condenser. A valved offtake 26 is provided at the bottom of the collector through which the product is drawn off at the end of the run. It will be understood that a number of condensers may be arranged in series and that the rich vapors may enter either at the top or at the bottom of the condenser although preferably the vapors are passed upwardly so as to be in countercurrent with the scrubbing liquid.

In Fig. 3 a modification of the condenser is shown wherein the scrubbing liquid is admitted through a pipe 13a to a manifold 15a having a plurality of openings 18a. The scrubbed gases are removed from the condenser at 12a.

In Fig. 4 the scrubbing liquid is admitted through a pipe 13b to a manifold 15b in the form of an overflow trough.

In Fig. 5 the scrubbing liquid is admitted through a pipe 13c to an upwardly directed spray nozzle 30. The scrubbing agent is supplied under pressure. The scrubbed gases are withdrawn through the offtake pipe 12c.

It will be understood that the scrubbing may be continued for any desired length of time to obtain an admixture having the desired concentration of phthalic anhydride and scrubbing material. From the collector the product may be withdrawn directly to a cooking kettle wherein the alkyd resin is formed or the product may be stored for subsequent use, altho it is contemplated that the admixture of scrubbing liquid and phthalic anhydride be employed directly after recovery, and the heat exchange units employed in the collector serve to insure the desired consistency of the withdrawn product. It will also be understood that additional phthalic anhydride or the ingredients contained in the scrubbing liquid may be heated in the cooking kettle or further ingredients not included in either the scrubbing liquid or the materials extracted from the vapors, may be added as for example other polybasic acids or resinous materials such as colophony, copals or the like.

It will be apparent that one of the functions of the scrubbing liquid is to keep the condenser walls wet and thereby prevent any phthalic anhydride from condensing on the walls. Where glycerine or other polyhydric alcohol is employed it is found that some esterification takes place and the phthalic anhydride dissolves to an extent corresponding to the solubility of the phthalic anhydride at the temperature employed. The final product is therefore a mixture of phthalic anhydride and/or acid, with glycerine and glycerine phthalate. Enough glycerine is used so that the product at the end of a predetermined period of time will contain one third glycerine and two thirds phthalic anhydride. If glycerine in above amount is used, the mixture as it comes from the condenser is ready for reaction to form alkyd resins. The composition may have to be adjusted by addition of phthalic anhydride or glycerine.

It is found that heat is removed from the vapors containing phthalic anhydride much more efficiently by the use of glycerine, for example, as a scrubbing fluid, than where air alone is used as the cooling medium, as is customary. Also a more efficient control of the cooling is obtained where the scrubbing liquid is continuously circulated by means of a pump as in the present process.

The invention has been described in detail for the purpose of illustration but variations and modifications thereof will be apparent to those skilled in the art. For example, it will be understood that the vapors entering the condenser may come either direct from the converter or may be derived from any other source.

We claim:

1. A process of removing phthalic anhydride from vapors containing it which comprises scrubbing the vapors with a cooling and scrubbing liquid, which is capable of reaction with the phthalic anhydride to form a useful product.

2. A process which comprises scrubbing vapors containing phthalic anhydride with a liquid which does not immediately react but is capable of subsequently reacting with the recovered phthalic anhydride, withdrawing the mixture from the scrubbing zone, and subsequently reacting the phthalic anhydride and the scrubbing liquid.

3. A process as set forth in claim 2 wherein the scrubbing liquid includes glycerine.

4. A process of removing phthalic anhydride from vapors containing it which comprises scrubbing the vapors with a cooling and scrubbing liquid comprising essentially an ingredient which does not immediately react with the phthalic anhydride, but is capable of subsequent reaction therewith to form a useful product.

5. A process for removing phthalic anhydride from vapors containing it which comprises scrubbing the vapors with a cooling and scrubbing liquid comprising essentially an ingredient which is capable of entering into a reaction in conjunction with the phthalic anhydride to form an alkyd resin.

6. A process as set forth in claim 5 wherein the scrubbing liquid comprises essentially a polyhydric alcohol.

7. A process as set forth in claim 5 wherein the scrubbing liquid comprises essentially a glyceride.

8. A process as set forth in claim 5 wherein the scrubbing liquid comprises essentially a fatty oil.

9. A process as set forth in claim 5 wherein the scrubbing liquid comprises essentially a semi-drying oil.

10. A process as set forth in claim 5 wherein the scrubbing liquid comprises essentially a fatty acid.

HELMUTH REICHHOLD.
CARL H. B. JARL.